US006785232B1

United States Patent
Kotser et al.

(10) Patent No.: US 6,785,232 B1
(45) Date of Patent: Aug. 31, 2004

(54) RATE CONTROL IN TRANSMISSION OF PACKET DATA OVER AN ATM NETWORK

(75) Inventors: Yoav Kotser, Givataim (IL); Omer Goldfisher, Givataim (IL)

(73) Assignee: Orckit Communications Ltd., Tel Aviv (IL)

( * ) Notice: Subject to any disclaimer, the term of this patent is extended or adjusted under 35 U.S.C. 154(b) by 815 days.

(21) Appl. No.: 09/723,206

(22) Filed: Nov. 27, 2000

(51) Int. Cl.$^7$ .............................................. H04L 12/00
(52) U.S. Cl. .............................. 370/230.1; 370/235.1; 370/395.1; 709/228
(58) Field of Search ................................. 370/229, 230, 370/203.1, 231, 232, 233, 234, 235, 235.1, 236, 395.1, 395.2, 395.21; 709/227, 228, 230, 231, 233, 235

(56) References Cited

U.S. PATENT DOCUMENTS

| | | | | |
|---|---|---|---|---|
| 5,115,429 A | * | 5/1992 | Hluchyj et al. | 370/231 |
| 5,400,329 A | * | 3/1995 | Tokura et al. | 370/232 |
| 5,533,020 A | * | 7/1996 | Byrn et al. | 370/395.4 |
| 5,649,110 A | * | 7/1997 | Ben-Nun et al. | 370/351 |
| 6,046,979 A | * | 4/2000 | Bauman | 370/229 |
| 6,085,221 A | * | 7/2000 | Graf | 709/202 |
| 6,515,963 B1 | * | 2/2003 | Bechtolsheim et al. | 370/229 |
| 6,600,720 B1 | * | 7/2003 | Gvozdanovic | 370/230 |

OTHER PUBLICATIONS

"Traffic Management", http://www.cisco.com/univercd/cc/td/doc/product/atm, pp. 1–10, 1989, Cisco Systems.
De Prycker, *Synchronous Transfer Mode: Solution for Broadband ISDN*, Chapter 7, Prentice Hall, London, 1995, pp. 304–315.
Orckit Product Information, CPE Modem, pp. 1–2, 1998.
"Helium 200/210 Communication Processor", pp. 1–2, 2001 http://www.virata.com/products/heliumshowcase.htm.
Cisco Systems, "Introduction to LightStream", pp. 1–10, 1989, http://www.cisco.com/univercd/cc/td/doc/product/atm.
The ATM Forum Technical Committee, "Traffic Management Specification", version 4.0, af–tm–0056.00, Apr. 1996, pp. 1–100.
International Telecommunication Union, ITU–T, I.371, "Traffic Control and Congestion Control in B–ISDN", pp. 1–78, Aug. 1998.
"Traffic Management", LightStream 2020 System Overview, Chapter 4, 1998, pp. 4–1 –4–12.

* cited by examiner

*Primary Examiner*—Hassan Kizou
*Assistant Examiner*—D L Levitan
(74) *Attorney, Agent, or Firm*—Darby & Darby

(57) ABSTRACT

A method for controlling data transmission over a network includes receiving a succession of data packets from a packet input at a potentially variable input rate, each packet in the succession potentially having a respective, non-uniform packet size. For each of the packets in the succession, the respective packet size is compared to a transmission credit allocated to the input. If the allocated credit is sufficient, compared to the respective packet size, the packet is transmitted over the network at a peak transmission rate predetermined by the network. If the allocated credit is insufficient, compared to the respective size, at least a portion of the packet is transmitted over the network at a rate no greater than a sustainable transmission rate predetermined by the network, which sustainable transmission rate is less than the peak transmission rate.

26 Claims, 4 Drawing Sheets

RATE CONTROL IN TRANSMISSION OF PACKET DATA OVER AN ATM NETWORK

FIELD OF THE INVENTION

The present invention relates generally to data communication systems, and specifically to traffic management of subscriber access to a high-speed network.

BACKGROUND OF THE INVENTION

When a subscriber establishes a data connection to an Asynchronous Transfer Mode (ATM) network, a traffic contract is negotiated between the subscriber and the network specifying, inter alia, rates at which the network will accept data from the subscriber. Within the limits of these rates, the network guarantees that all data transmitted by the subscriber will be accepted and transmitted over the network. When the subscriber exceeds the contract rates, the network is liable to discard the excess data, although it may attempt to transmit the excess data when bandwidth is available.

The algorithm used in ATM networks for controlling transmission rates is known as the Generic Cell Rate Algorithm (GCRA). GCRA operates, metaphorically, as a leaky bucket, with a fixed leak rate corresponding to a sustainable transmission rate specified by the subscriber's contract. When the subscriber transmits for a period at a rate that is lower than the sustainable contract rate, the bucket empties out, giving the subscriber the option subsequently of transmitting at a higher rate until the bucket fills up. Sustained transmission above the contract rate, however, will cause the bucket to fill up and overflow, whereupon excess cells are discarded. GCRA is defined formally in recommendation I.371 of the International Telecommunication Union (ITU-T) and in specification AF-TM-0056.00 of the ATM Forum (Traffic Management Specification Version 4.0). A concise definition and description of the algorithm is provided by de Prycker in Chapter 7 of *Asynchronous Transfer Mode: Solution for Broadband ISDN* (Prentice Hall, London, 1995). All of these documents are incorporated herein by reference.

GCRA specifies three key parameters for controlling subscriber transmission rates: the Peak Cell Rate (PCR), Sustainable Cell Rate (SCR) and Burst Tolerance ($\tau_s$). PCR is a mandatory parameter, defined as the inverse of a minimum time T that is allowed between the arrivals of any two consecutive cells at the network interface. If cells are spaced by less than T, there is no guarantee that they will be transmitted. SCR and $\tau_s$ are optional, and are provided in order to enable the network to allocate resources more efficiently. SCR represents the average, long-term cell rate (less than the PCR) that the network guarantees to support. It corresponds to the leak rate of the bucket mentioned above. The subscriber may transmit data continuously at the SCR. If the subscriber transmits below the SCR for a period of time, however, the subscriber's "bucket" empties out, and it becomes possible for the subscriber to transmit a burst of data at the PCR. The size of the burst that will be accepted by the network depends on how "empty" the bucket is (i.e., how far below the SCR was the subscriber's transmission rate, and for how long). In any case, the burst may be no larger than a Maximum Burst Size (MBS), defined by:

$$MBS = [1 + \tau_s/(T_s - T)] \qquad (1)$$

wherein $T_s = 1/SCR$. The MBS corresponds roughly to the volume of the bucket.

ATM networks carry cells of constant, fixed size. The GCPA is therefore defined in terms of minimum times allowed between cells (T, $T_s$, and $\tau_s$). ATM systems measure these times in order to implement the algorithm. On the other hand, in packet data networks, such as Internet Protocol (IP) networks, the size of the packets is variable. Thus, when subscriber equipment generating variable-size packets is interfaced to a high-speed ATM network, it is necessary to take the packet size and packet rate into account in applying the GCRA. An approach of this sort is used in the Cisco Systems LightStream 2020 multiservice ATM switch. The traffic management properties of this switch are described in a document available at www.cisco.com/univercd/cc/td/doc/product/atm/12020/2020r211/sysover/traffic.htm, which is incorporated herein by reference. The approach adopted by this switch, however, applies only the mandatory PCR to the incoming packets. It does not attempt to deal with the added complication of the optional SCR and MBS parameters.

SUMMARY OF THE INVENTION

It is an object of the present invention to provide improved methods and apparatus for network traffic control.

It is a further object of some aspects of the present invention to provide improved methods and apparatus for implementing the GCRA in an ATM network access system that receives packet data for transmission over the network.

It is a particular object of such aspects of the present invention to provide methods and apparatus for applying the GCRA using the optional SCR and MBS parameters.

In preferred embodiments of the present invention, an ATM network edge access interface receives data packets from a subscriber for transmission over the ATM network as cells. A contract between the subscriber and the network specifies the PCR, SCR and MBS (or the equivalent times T, $\tau_s$ and $\tau_s$). As long as the data rate of the input packets does not exceed the SCR, the interface converts the packets to ATM cells and transmits them at a rate equal to or less than the SCR. As long as the input packet data rate is below the SCR, the subscriber accrues a "credit" at the network interface, up to a maximum given by the MBS. This credit is used subsequently, if the packet rate exceeds the SCR, to enable the interface to accept a burst of packet data and to transmit the data at the PCR.

The network access interface of the present invention is thus able to transmit packet data over the ATM network at either the PCR or the SCR (or below), making more efficient use of available bandwidth than is afforded by network equipment known in the art. Furthermore, by implementing transmission rate control at the packet level, rather than at the cell level as in systems known in the art, the present invention can help to reduce the computational load due to the rate control algorithm.

There is therefore provided, in accordance with a preferred embodiment of the present invention, a method for controlling data transmission over a network, including:

receiving a succession of data packets from a packet input at a potentially variable input data rate, each packet in the succession potentially having a respective, non-uniform packet size; and for each of the packets in the succession:

comparing the respective packet size to a transmission credit allocated to the input;

if the allocated credit is sufficient, compared to the respective packet size, transmitting the packet over the network at a peak data transmission rate predetermined by the network; and if the allocated credit is insufficient, compared to the respective size, transmitting at least a portion of the packet over the network at a rate no greater than a sustainable transmission data rate predetermined by the network, which sustainable transmission rate is less than the peak data transmission rate.

Preferably, transmitting at least a portion of the packet includes, if the allocated credit is insufficient compared to the respective packet size, transmitting the entire packet at the sustainable data transmission rate.

Alternatively, transmitting at least a portion of the packet includes, if the allocated credit is insufficient compared to the respective packet size, transmitting a first portion of the packet at the peak data transmission rate and transmitting a remaining portion of the packet at the sustainable data transmission rate. Preferably, transmitting the first portion comprises transmitting a quantity of the data that is substantially equal to the allocated credit, and reducing the credit substantially to zero after transmitting the quantity of the data that is substantially equal to the allocated credit.

In a preferred embodiment, the network includes an Asynchronous Transfer Mode (ATM) network, and the peak and sustainable data transmission rates respectively correspond to peak and sustainable cell rates. Preferably, receiving the succession of data packets includes receiving the packets over an Ethernet link.

Preferably, the method includes increasing the transmission credit allocated to the input when the variable input rate is less than the sustainable transmission rate. Further preferably, increasing the transmission credit includes finding a time of completion of transmission from the interface of a first one of the packets and a time of arrival at the interface of a second one of the packets, successive to the first packet, and increasing the credit responsive to a difference between the time of completion of transmission of the first packet and the time of arrival of the second packet. Most preferably, finding the time of transmission includes estimating the time of transmission of the first packet responsive to the size of the first packet and the rate of transmission of the first packet. Additionally or alternatively, increasing the transmission credit includes increasing the credit up to a maximum credit that is proportional to a maximum burst size predetermined by the network.

Preferably, transmitting the packet at the peak transmission rate includes reducing the transmission credit allocated to the input by an amount proportional to the packet size.

There is also provided, in accordance with a preferred embodiment of the present invention, apparatus for controlling data transmission over a high-speed network, including:

an input packet interface, configured to receive over a packet link at a variable input rate a succession of packets containing data, each packet in the succession having a respective, non-uniform packet size;

an output interface to the network, configured to transmit the data over the high-speed network at either a peak transmission rate predetermined by the network or at a rate no greater than a sustainable transmission rate predetermined by the network, which sustainable transmission rate is less than the peak transmission rate; and a processor, coupled between the input and output interfaces and adapted to control the transmission rate of the data contained in each of the data packets in the succession by comparing the respective packet size to an allocated transmission credit, such that if the allocated credit is sufficient, compared to the respective packet size, the packet is transmitted over the network at the peak transmission rate, while if the allocated credit is insufficient, compared to the respective packet size, the packet is transmitted at the rate no greater than the sustainable transmission rate.

The present invention will be more fully understood from the following detailed description of the preferred embodiments thereof, taken together with the drawings in which:

DETAILED DESCRIPTION OF PREFERRED EMBODIMENTS

Figure 1:
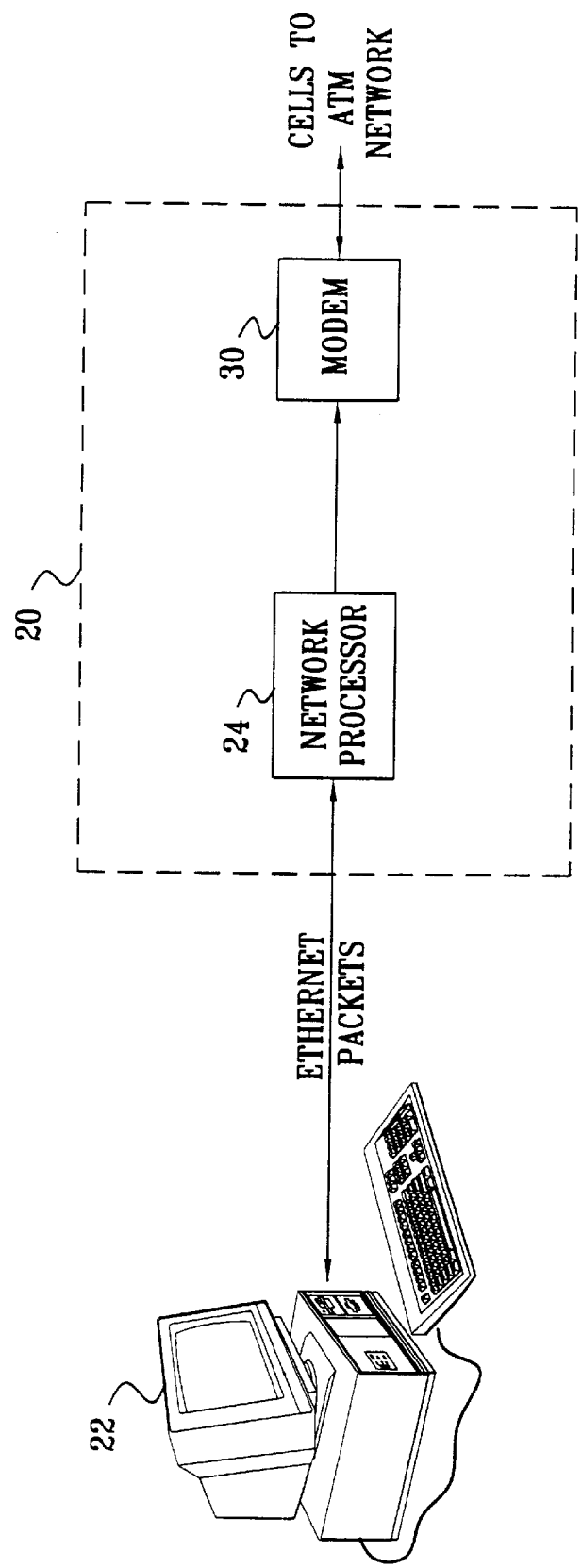
FIG. 1 is a block diagram that schematically illustrates network access interface apparatus, in accordance with a preferred embodiment of the present invention.

FIG. 1 is a block diagram that schematically illustrates network access interface apparatus 20, for linking subscriber equipment 22 to an ATM network, in accordance with a preferred embodiment of the present invention. The subscriber equipment generates packet data, which are preferably conveyed to apparatus 20 over a Local Area Network (LAN) connection, such as an Ethernet line, as is known in the art. Apparatus 20 is preferably a part of a Digital Subscriber Line access device, such as the CPE system produced by Orckit Communications Ltd., of Tel Aviv, Israel. Typically, apparatus 20 belongs to a remote access unit (known as ATU-R) of the DSLAM. The ATU-R is typically installed at the subscriber's premises and is linked by a telephone line to a central office having a trunk connection to the ATM network. Alternatively, apparatus 20 may be used, mutatis mutandis, in other ATM network access applications.

Apparatus 20 comprises a network processor 24, which communicates with subscriber equipment 22, and a modem 30, preferably an Asymmetric DSL (ADSL) modem, for communicating over the telephone line with the ATM network. For example, Virata, of Santa Clara, Calif., produces a device known as "Helium," which can perform the functions of processor 24. The network processor is responsible for the Ethernet packet interface with equipment 22, as well as for converting the packets received from equipment 22 into ATM cells, while implementing the ATM Generic Cell Rate Algorithm (GCRA) to control data throughput, as described hereinbelow. The protocol processor preferably communicates with modem 30 over a Utopia interface, as is known in the ATM art.

Figure 2:
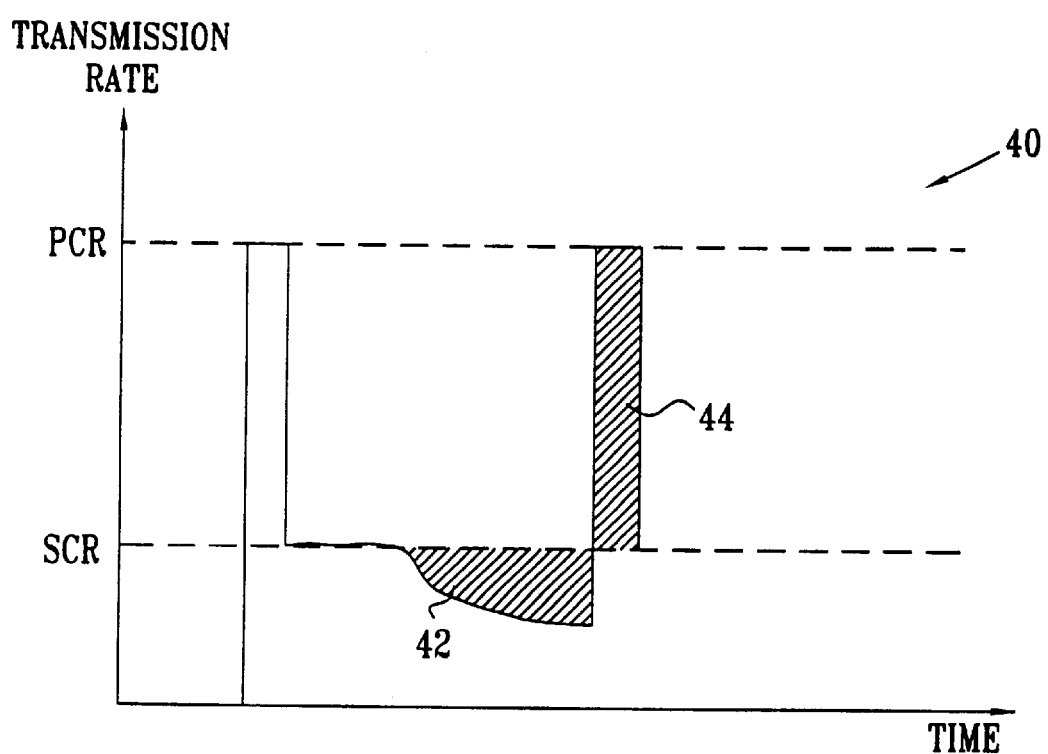
FIG. 2 is a schematic plot of packet data transmission rate over time, in accordance with a preferred embodiment of the present invention.

FIG. 2 is a schematic plot 40 of the rate of cell data transmission over time by apparatus 20, in accordance with a preferred embodiment of the present invention. Two rates are defined by the above-mentioned ATM standards: the PCR and the SCR. Normally, processor 24 passes data through to modem 30 at the SCR or below, depending on the rate of packet data received from equipment 22. During a given period 42, the data rate drops below the SCR, and the subscriber accordingly accrues a "credit," indicated by hatching in the figure. The method by which this credit is calculated is described hereinbelow with reference to FIG. 3.

During a subsequent period 44, equipment 22 generates a burst of packets. Using the credit accrued during period 42, processor 24 transmits the burst at the PCR during period 44. The duration of the burst is limited by either the amount of the credit that accrued previously or by the MBS, whichever is smaller. When the credit is exhausted, processor 24 resumes transmission at the SCR.

Figure 3:
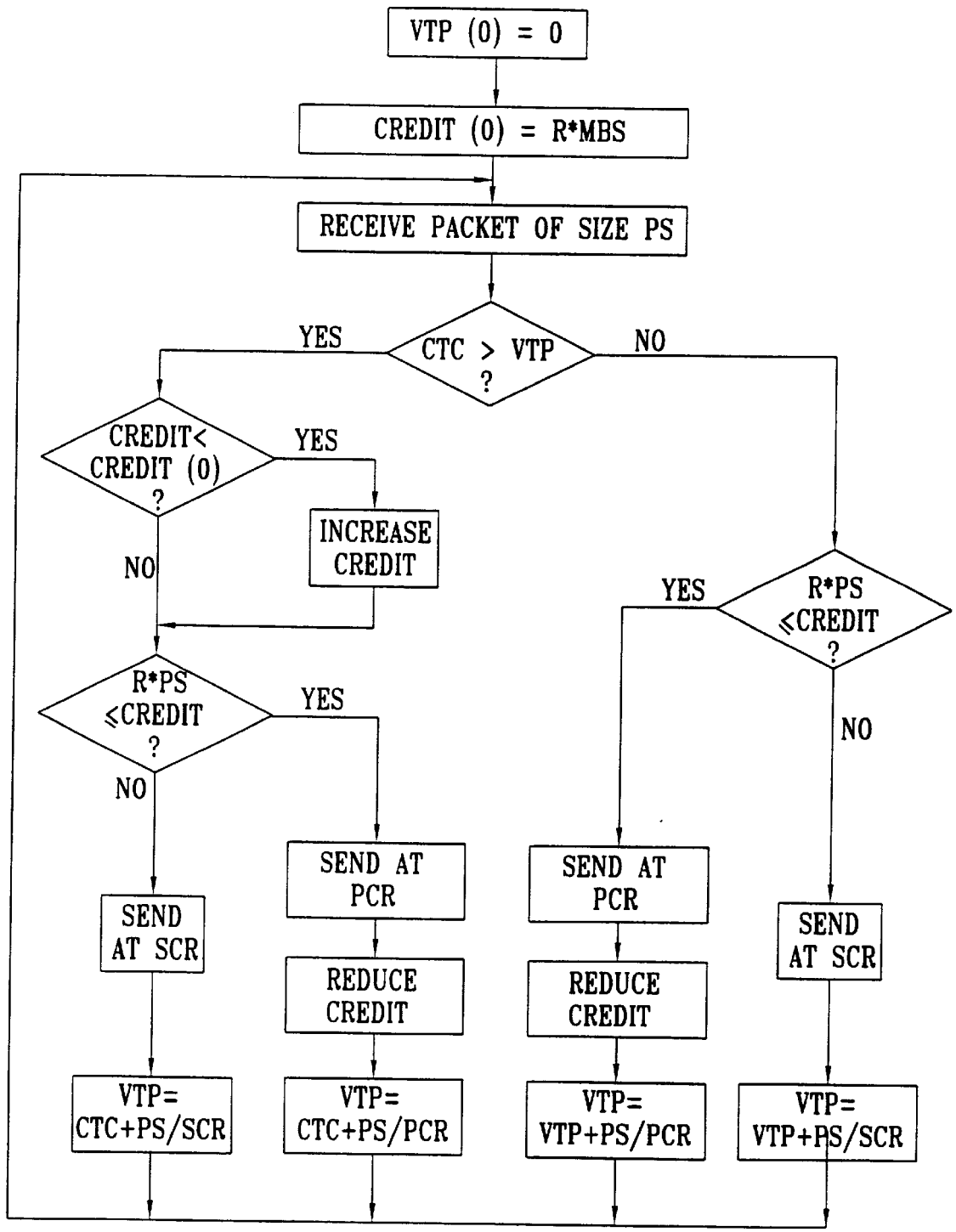
FIG. 3 is a flow chart that schematically illustrates a method for network traffic control, in accordance with a preferred embodiment of the present invention.

FIG. 3 is a flow chart that schematically illustrates a method for network traffic control implemented by processor 24, in accordance with a preferred embodiment of the present invention. For the purpose of this method, the following variables are defined for each packet processed by processor 24:

VTP—Estimated time of completion of transmission of the preceding packet by modem 30.
CTC—Arrival time of current packet at interface 24.
VTC—Estimated time of completion of transmission of the current packet by modem 30.
PS—packet size, in equivalent ATM cells (424 bits), wherein it is assumed that for any packet, PS(t)≦SMBS. A constant R is defined by R=(PCR−SCR)/PCR.

At start-up of the connection between equipment 22 and processor 24, VTP is set to zero, and a maximum credit amount [credit(0)], equal to R*MBS cells, is allocated to the subscriber. Subsequently, for each arriving packet, having a size PS, the processor first checks whether the packet has arrived later than the estimated end of transmission time of the preceding packet, i.e., if CTC>VTP. If so, the subscriber is entitled to accrue additional credit for as long as the subscriber's current credit level is less than the maximum credit. In this case, the credit is increased by SCR*(CTC−VTP), i.e., by an amount proportional to the "idle" time of the interface between the estimated end of transmission time of the preceding packet and the arrival time of the current packet.

Next the processor checks to determine whether the subscriber has sufficient credit accrued to send the current packet at the PCR, i.e., whether R*PS<credit. If so, the packet is sent at the PCR and the credit is reduced by R*PS. The estimated transmission time of the current packet, VTC (which becomes VTP in the next cycle of the method of FIG. 3), is set based on the arrival time CTC, assuming transmission of the packet at the PCR. On the other hand, if there is not sufficient credit accrued, the packet is sent at the SCR, and VTP is set assuming transmission at this slower rate.

If the current packet arrives before the estimated transmission time of the preceding packet, no additional credit can accrue. In this case, as in the previous case, if the credit accrued previously is greater than R*PS, then the packet is sent at the PCR, and the credit is reduced by R*PS. The estimated transmission time VTP of the current packet is set in this case based on the estimated transmission time VTP of the preceding packet. If there is not sufficient credit, the packet is sent at the SCR, and VTP is set accordingly.

After the current packet has been sent at the appropriate rate, the cycle repeats for each subsequent packet. Pseudocode corresponding to the cycle shown in FIG. 3 is listed in Table I, below:

TABLE I

```
credit(0) = R * MBS
if (CTC > VTP)
    credit = min(credit + SCR * (CTC − VTP), credit(0))
    if (R * PS(t) ≦ credit)
        put PCR
        credit = credit − R * PS
```

TABLE I-continued

```
        VTP = CTC + PS / PCR
    else
        put SCR
        VTP = CTC + PS / SCR
else
    if (R * PS(t) ≦ credit)
        put PCR
        credit = credit − R * PS
        VTP = VTP + PS / PCR
    else
        put SCR
        VTP = VTP + PS / SCR
```

Figure 4:
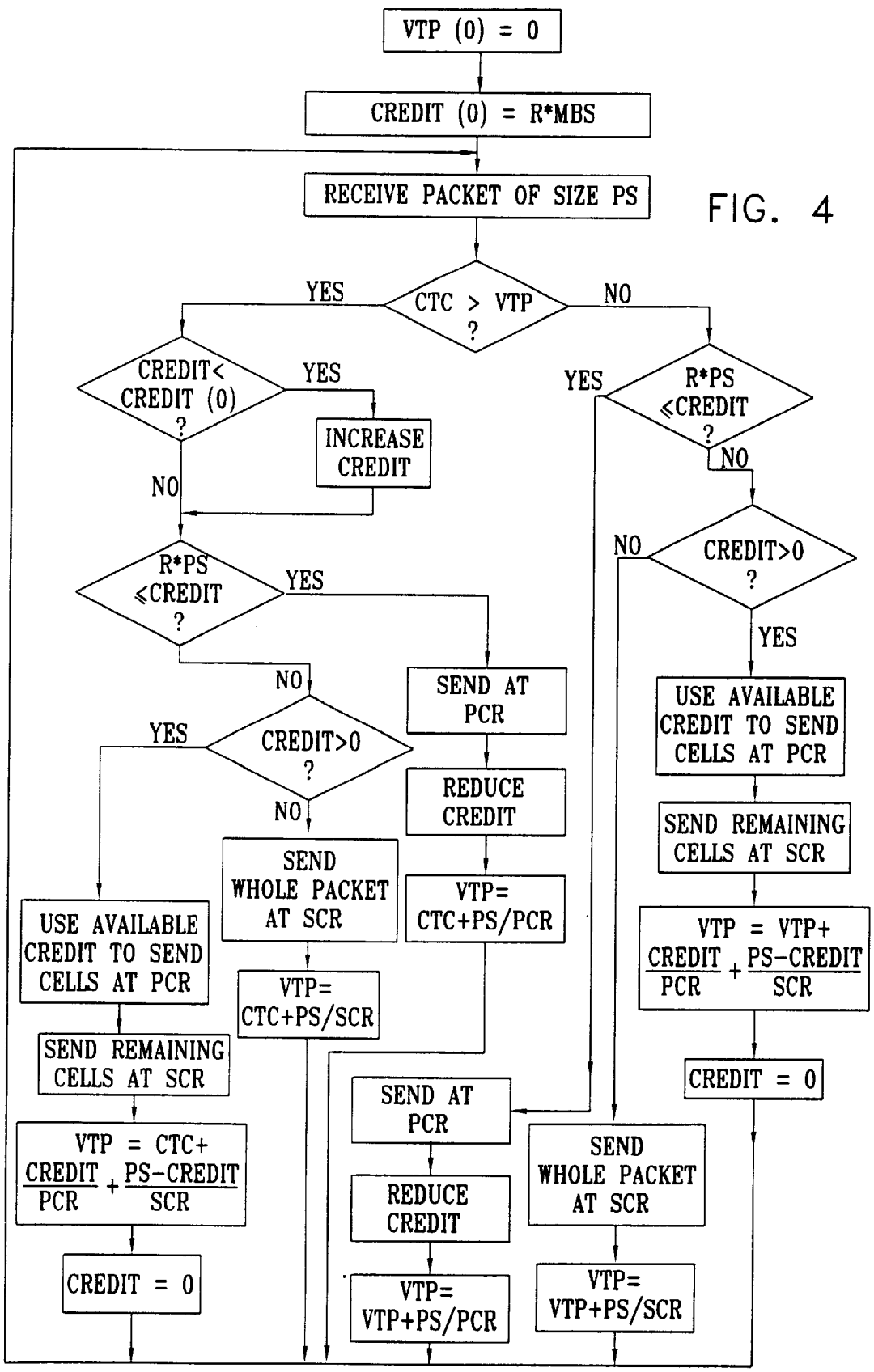
FIG. 4 is a flow chart that schematically illustrates an alternative method for network traffic control, in accordance with a preferred embodiment of the present invention.

FIG. 4 is a flow chart that schematically illustrates an alternative procedure for network traffic control, in accordance with a preferred embodiment of the present invention. This procedure is similar to the method of FIG. 3, but has the advantage of using available transmission capacity more fully and efficiently. For the sake of brevity, only those aspects of the procedure of FIG. 4 that differ substantively from those described above with reference to FIG. 3 are described hereinbelow.

Whenever it is determined that the subscriber's accrued credit is less than R*PS, the subscriber's remaining credit level is checked. If the credit has dropped to zero, then the entire packet is sent at the SCR and the new VTP is calculated, as in the embodiment of FIG. 3. On the other hand, if the subscriber has non-zero credit, processor 24 divides the packet into cells, and sends as many cells as the remaining credit will allow at the PCR. Once the credit is exhausted, the processor sends the remaining cells at the SCR. Upon completion of sending this packet, the subscriber remains with zero credit. For the case in which CTC>VTP (the left branch in the figure), VTP for the next packet will be given by:

$$VTP=CTC+\text{credit}/PCR+(PS-\text{credit})/SCR.$$

Otherwise (in the right branch), VTP is given by:

$$VTP=VTP+\text{credit}/PCR+(PS-\text{credit})/SCR.$$

Pseudocode corresponding to the cycle of FIG. 4 is presented in the table below:

TABLE II

```
credit(0) = R * MBS
if (CTC > VTP)
    credit = min(credit + SCR * (CTC − VTP), credit(0))
    if (R * PS(t) ≦ credit)
        put PCR
        credit = credit − R * PS
        VTP = CTC + PS / PCR
    else if (credit > 0)
        put credit cells at PCR
        credit = 0
        put (PS(t) − credit) cells at SCR
        VTP = CTC + credit / PCR +
            (PS − credit) / SCR
    else put SCR
        VTP = CTC + PS / SCR
else
    if (R * PS(t) ≦ credit)
        put PCR
        credit = credit − R * PS
        VTP = VTP + PS / PCR
    else if (credit > 0)
        put credit cells at PCR
        credit = 0
        put (PS(t) − credit) cells at SCR
```

TABLE II-continued

```
VTP = VTP + credit / PCR +
    (PS − credit) / SCR
else put SCR
    VTP = VTP + PS / SCR
```

Although the preferred embodiments described hereinabove are designed specifically for controlling a packet data input to an ATM network, the principles of the present invention may similarly be applied in interfacing to networks of other types. It will thus be appreciated that this preferred embodiment is cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

What is claimed is:

1. A method for controlling data transmission over a network, comprising:

receiving a succession of data packets from a packet input at a potentially variable input data rate, each packet in the succession potentially having a respective, non-uniform packet size; and for each of the packets in the succession:

comparing the respective packet size to a transmission credit allocated to the input;

if the allocated credit is sufficient, compared to the respective packet size, transmitting the packet over the network at a peak data transmission rate predetermined by the network; and if the allocated credit is insufficient, compared to the respective packet size, transmitting at least a portion of the packet over the network at a rate no greater than a sustainable data transmission rate predetermined by the network, which sustainable transmission rate is less than the peak transmission rate.

2. A method according to claim 1, wherein transmitting at least a portion of the packet comprises, if the allocated credit is insufficient compared to the respective packet size, transmitting the entire packet at the sustainable data transmission rate.

3. A method according to claim 1, wherein transmitting at least a portion of the packet comprises, if the allocated credit is insufficient compared to the respective packet size, transmitting a first portion of the packet at the peak data transmission rate and transmitting a remaining portion of the packet at the sustainable data transmission rate.

4. A method according to claim 3, wherein transmitting the first portion comprises transmitting a quantity of the data that is substantially equal to the allocated credit.

5. A method according to claim 4, and comprising reducing the credit substantially to zero after transmitting the quantity of the data that is substantially equal to the allocated credit.

6. A method according to claim 1, wherein the network comprises an Asynchronous Transfer Mode (ATM) network.

7. A method according to claim 6, wherein the peak and sustainable data transmission rates respectively comprise peak and sustainable cell rates.

8. A method according to claim 6, wherein receiving the succession of data packets comprises receiving the packets over an Ethernet link.

9. A method according to claim 1, and comprising increasing the transmission credit allocated to the input when the variable input rate is less than the sustainable transmission rate.

10. A method according to claim 9, wherein increasing the transmission credit comprises finding a time of completion of transmission from the interface of a first one of the packets and a time of arrival at the interface of a second one of the packets, successive to the first packet, and increasing the credit responsive to a difference between the time of completion of transmission of the first packet and the time of arrival of the second packet.

11. A method according to claim 10, wherein finding the time of transmission comprises estimating the time of transmission of the first packet responsive to the size of the first packet and the rate of transmission of the first packet.

12. A method according to claim 9, wherein increasing the transmission credit comprises increasing the credit up to a maximum credit that is proportional to a maximum burst size predetermined by the network.

13. A method according to claim 1, wherein transmitting the packet at the peak transmission rate comprises reducing the transmission credit allocated to the input by an amount proportional to the packet size.

14. Apparatus for controlling data transmission over a high-speed network, comprising:

an input packet interface, configured to receive over a packet link at a variable input data rate a succession of packets containing data, each packet in the succession having a respective, non-uniform packet size;

an output interface to the network, configured to transmit the data over the high-speed network at either a peak data transmission rate predetermined by the network or at a rate no greater than a sustainable data transmission rate predetermined by the network, which sustainable transmission rate is less than the peak transmission rate; and a processor, coupled between the input and output interfaces and adapted to control the transmission rate of the data contained in each of the data packets in the succession by comparing the respective packet size to an allocated transmission credit, such that if the allocated credit is sufficient, compared to the respective packet size, the packet is transmitted over the network at the peak data transmission rate, while if the allocated credit is insufficient, compared to the respective packet size, at least a portion of the packet is transmitted at the rate no greater than the sustainable data transmission rate.

15. Apparatus according to claim 14, wherein if the allocated credit is insufficient compared to the respective packet size, the entire packet is transmitted at the sustainable data transmission rate.

16. Apparatus according to claim 14, wherein if the allocated credit is insufficient compared to the respective packet size, a first portion of the packet is transmitted at the peak data transmission rate, and a remaining portion of the packet is transmitted at the sustainable data transmission rate.

17. Apparatus according to claim 16, wherein the first portion comprises a quantity of the data that is substantially equal to the allocated credit.

18. Apparatus according to claim 17, wherein the credit is reduced substantially to zero after the quantity of the data that is substantially equal to the allocated credit is transmitted.

19. Apparatus according to claim 14, wherein the high-speed network comprises an Asynchronous Transfer Mode (ATM) network.

20. Apparatus according to claim 19, wherein the peak and sustainable data transmission rates respectively comprise peak and sustainable cell rates.

21. Apparatus according to claim 20, wherein the packet link comprises an Ethernet link.

22. Apparatus according to claim 14, wherein the processor is adapted to increase the allocated transmission credit when the variable input rate is less than the sustainable transmission rate.

23. Apparatus according to claim 22, wherein the processor is adapted to find a time of completion of transmission from the output interface of a first one of the packets and a time of arrival at the input interface of a second one of the packets, successive to the first packet, and to increase the credit responsive to a difference between the time of completion of transmission of the first packet and the time of arrival of the second packet.

24. Apparatus according to claim 23, wherein the processor is adapted to estimate the time of transmission of the first packet responsive to the size of the first packet and the rate of transmission of the first packet.

25. Apparatus according to claim 22, wherein the processor is adapted to increase the credit up to a maximum credit that is proportional to a maximum burst size predetermined by the network.

26. Apparatus according to claim 14, wherein when the packet is transmitted at the peak transmission rate, the processor is adapted to reduce the allocated transmission credit by an amount proportional to the packet size.

* * * * *